United States Patent
Lewis et al.

(10) Patent No.: US 7,998,729 B2
(45) Date of Patent: Aug. 16, 2011

(54) COMPOSTING CAGE

(75) Inventors: Robert Lewis, Thornton (GB); Craig Wright, Preston (GB); Alan Heyworth, Rawtenstall (GB)

(73) Assignee: The TEG Group Plc, Chorley, Lancashire (GB)

( * ) Notice: Subject to any disclaimer, the term of this patent is extended or adjusted under 35 U.S.C. 154(b) by 325 days.

(21) Appl. No.: 12/439,095

(22) PCT Filed: Aug. 7, 2007

(86) PCT No.: PCT/GB2007/003012
§ 371 (c)(1),
(2), (4) Date: Feb. 26, 2009

(87) PCT Pub. No.: WO2008/025942
PCT Pub. Date: Mar. 6, 2008

(65) Prior Publication Data
US 2010/0015693 A1 Jan. 21, 2010

(30) Foreign Application Priority Data
Aug. 31, 2006 (GB) .................................. 0617109.4

(51) Int. Cl.
*C12M 1/00* (2006.01)

(52) U.S. Cl. ...................... 435/290.1; 435/290.4; 71/9
(58) Field of Classification Search .... 435/290.1–290.4; 119/6.7; 71/9
See application file for complete search history.

(56) References Cited

U.S. PATENT DOCUMENTS

| | | | | |
|---|---|---|---|---|
| 5,527,373 A | * | 6/1996 | Chareyre | 71/9 |
| 2002/0064868 A1 | * | 5/2002 | Bilborough et al. | 435/290.4 |
| 2002/0144658 A1 | * | 10/2002 | Holcombe et al. | 119/6.7 |

FOREIGN PATENT DOCUMENTS

| | | |
|---|---|---|
| DE | 3924844 A1 | 1/1991 |
| DE | 19832787 A1 | 1/2000 |
| EP | 0281699 A1 | 9/1988 |
| EP | 0621248 A1 | 10/1994 |
| FR | 2625987 A1 | 7/1989 |
| JP | 0859381 A | 3/1996 |

* cited by examiner

*Primary Examiner* — Walter D Griffin
*Assistant Examiner* — Shanta G Doe
(74) *Attorney, Agent, or Firm* — Janet Sleath; Speckman Law Group PLLC

(57) ABSTRACT

Offloading apparatus (30) for a composting cage comprising an enclosure (10), which maybe divided into a plurality of compartments, for receipt of material to be composted is mounted below the enclosure (10) and is capable of travelling there below in order to extract compost from the base of the enclosure. The offloading apparatus (30) comprises an elongate cutter (40) in the form of a motor driven endless chain on which cutting teeth (42) are mounted, and respective winch assemblies (50) mounted adjacent each side of the enclosure (10). Each winch assembly (50) comprises a motor driven winch (54), a pulley (56) mounted to an adjustable tensioning assembly (58) at a spacing from the winch (54), and a winch cable (51) extending from the winch (54) around the pulley (56) and back again to the winch (54). The cutter (40) extends below the enclosure (10) between the respective winch assemblies (50) in such a manner as to be movable by the winch assembles (50) in a direction substantially perpendicular to its own elongate axis.

4 Claims, 6 Drawing Sheets

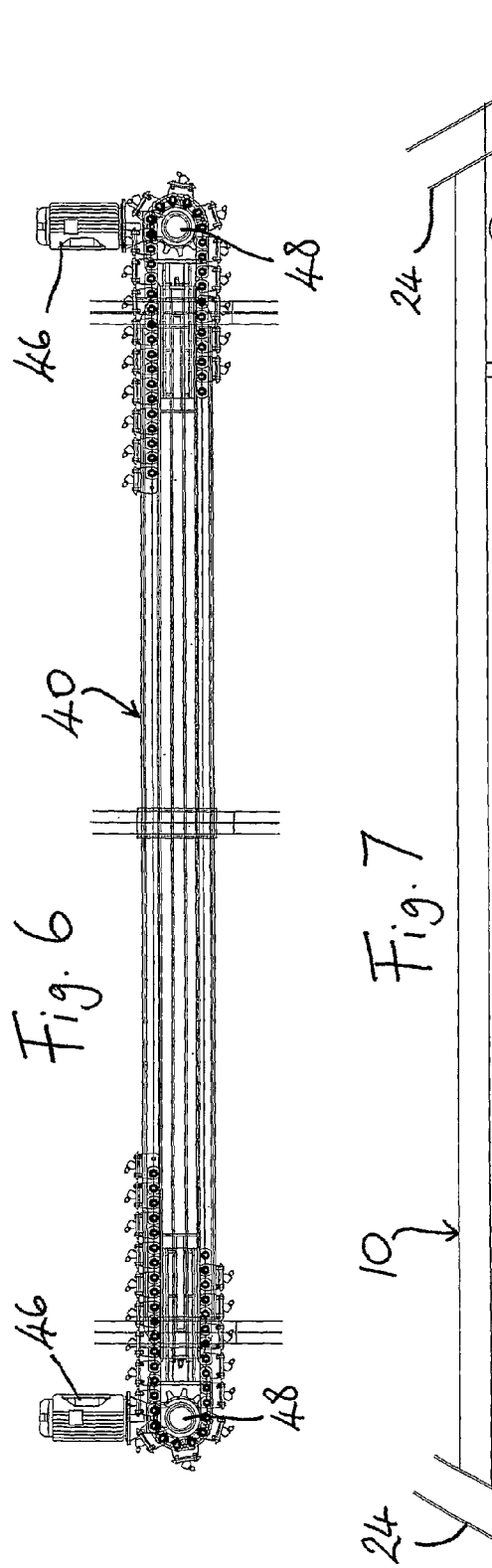
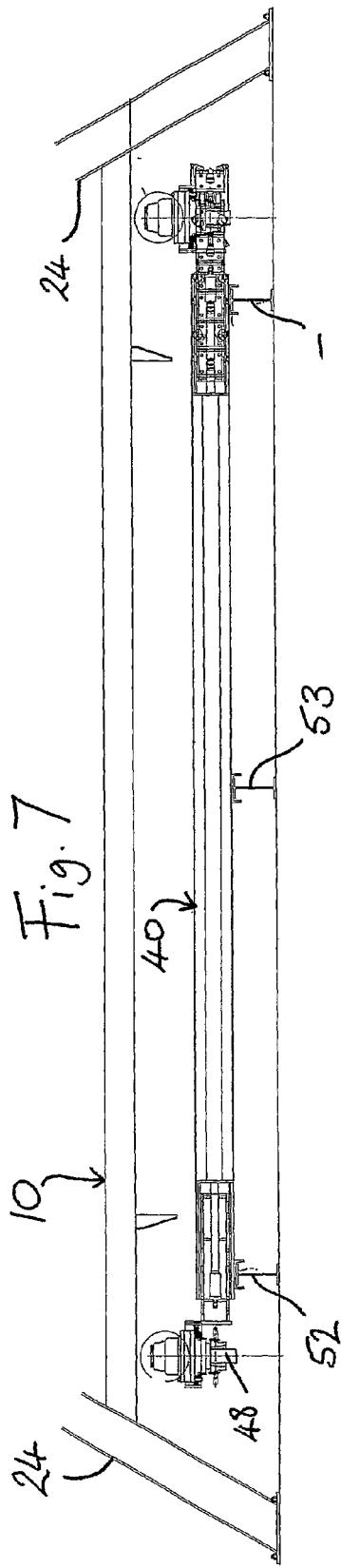
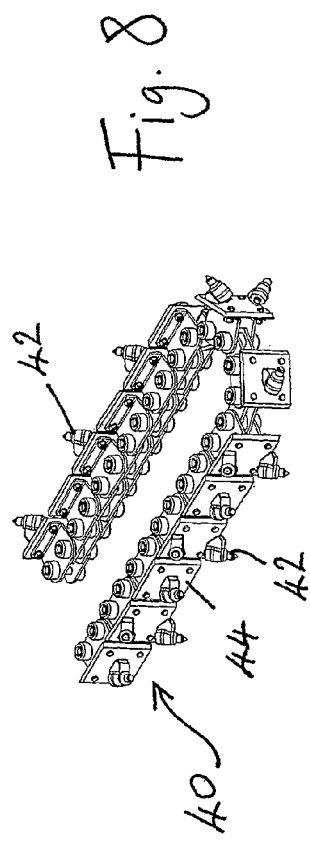

COMPOSTING CAGE

REFERENCE TO RELATED APPLICATIONS

This application is the US national phase entry of International Patent Application No. PCT/GB2007/003012, filed Aug. 7, 2007, which claims priority to UK Patent Application No. 0617109.4, filed Aug. 31, 2006.

BACKGROUND

The present invention concerns a composting cage comprising an enclosure, which may be divided into a plurality of compartments, and offloading apparatus mounted below the enclosure in order to extract compost from the base of the enclosure.

In FR-A-2473038 and in the applicant's own earlier EP-A-1192098 the offloading apparatus for such a composting cage is disclosed as comprising an auger which is mounted below the enclosure and is capable of travelling there below from one end to the other whilst also rotating on its own axis in order to remove material to one side of the base of the cage. In order to remove compost material evenly from the base of the enclosure, it is important to try and move the respective ends of the auger at the same rate so that the axis of the auger remains substantially perpendicular to the direction of its travel. In the applicant's earlier arrangement, as described in the EP-A-119209, the respective ends of the auger were supported upon respective guide rails at the sides of the enclosure base and the auger was moved intermittently along these rails by a coordinated system of hydraulic rams at each end of the auger which operated in synchrony. While this system of offloading works satisfactorily, it is relatively complex and expensive to manufacture and maintain.

An object of the present invention it is to provide an alternative offloading system which is less complex and expensive.

EP-A-0281699 discloses a composting enclosure having offloading apparatus mounted there below in order to extract compost from the base of the enclosure, as aforesaid, wherein the offloading apparatus comprises an elongate cutter in the form of a motor driven endless chain on which cutting teeth are mounted. This cutter extends below the enclosure and is capable of travelling below the enclosure. It is mounted to the side walls of the enclosure so as to be suspended there below.

In contrast, the present invention is characterised in that the offloading apparatus mounted below the enclosure of the composting cage further comprises respective winch assemblies mounted along each side of the base of the enclosure, each winch assembly comprising a motor driven winch, a pulley mounted to an adjustable tensioning assembly at a spacing from the winch, and a winch cable extending from the winch, around the pulley and back again to the winch, said cutter extending below the enclosure, between the respective winch assemblies, in such a manner as to be movable by said winch assemblies in a direction substantially perpendicular to its elongate axis.

Furthermore, it is preferred that the offloading apparatus, comprising the cutter and the winch assemblies should be mounted separately from the enclosure, preferably supported directly upon the ground or floor.

BRIEF DESCRIPTION OF THE FIGURES

The invention will be described further, by way of example, with reference to the accompanying drawings, in which:

FIG. 6 is an enlarged scale plan view of the cutter used in the composting cage illustrated in the preceding figures;

FIG. 7 is an enlarged scale front elevation of the cutter shown in FIG. 6 out mounted below the composting cage illustrated in FIGS. 1 to 4; and FIG. 8 is an enlarged scale perspective view of part of the cutter shown in FIGS. 6 and 7.

DETAILED DESCRIPTION

Figure 1:
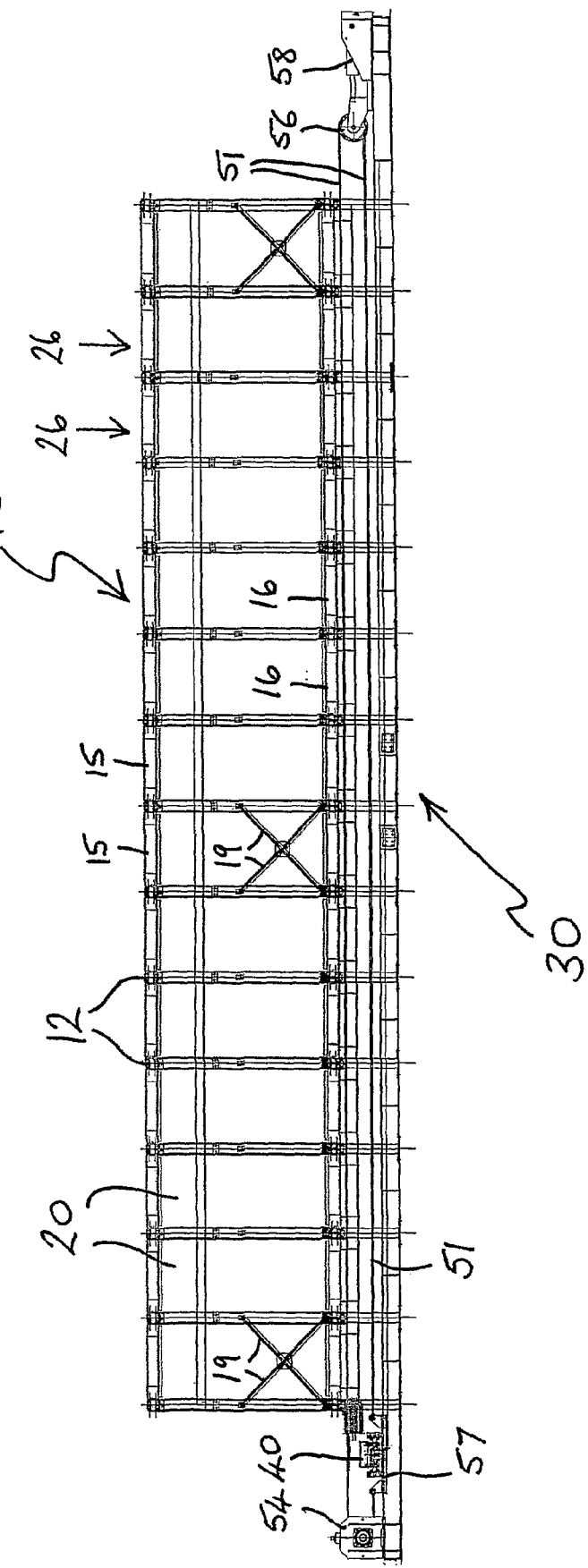
FIG. 1 is a side elevation of a practical embodiment of a composting cage in accordance with the invention.

Referring firstly to FIGS. 1 to 4, a practical embodiment of a composting cage of the invention comprises a modular enclosure 10 and offloading apparatus 30 which is mounted below the enclosure 10.

The enclosure 10 is a framework of elongate structural elements 15-18 and panels 20 which are interconnected to provide cross walls 12 and side walls 14 defining a plurality of compartments 26 into which material to be composted is deposited from above. In the illustrated design fourteen compartments 26 are shown. Because of the modular nature of the construction, however, any desired number of compartments 26 from one upwards can be provided by addition of the necessary elements and panels 20 to form further cross walls 12 and appropriate extensions to the side walls 14.

Figure 3:
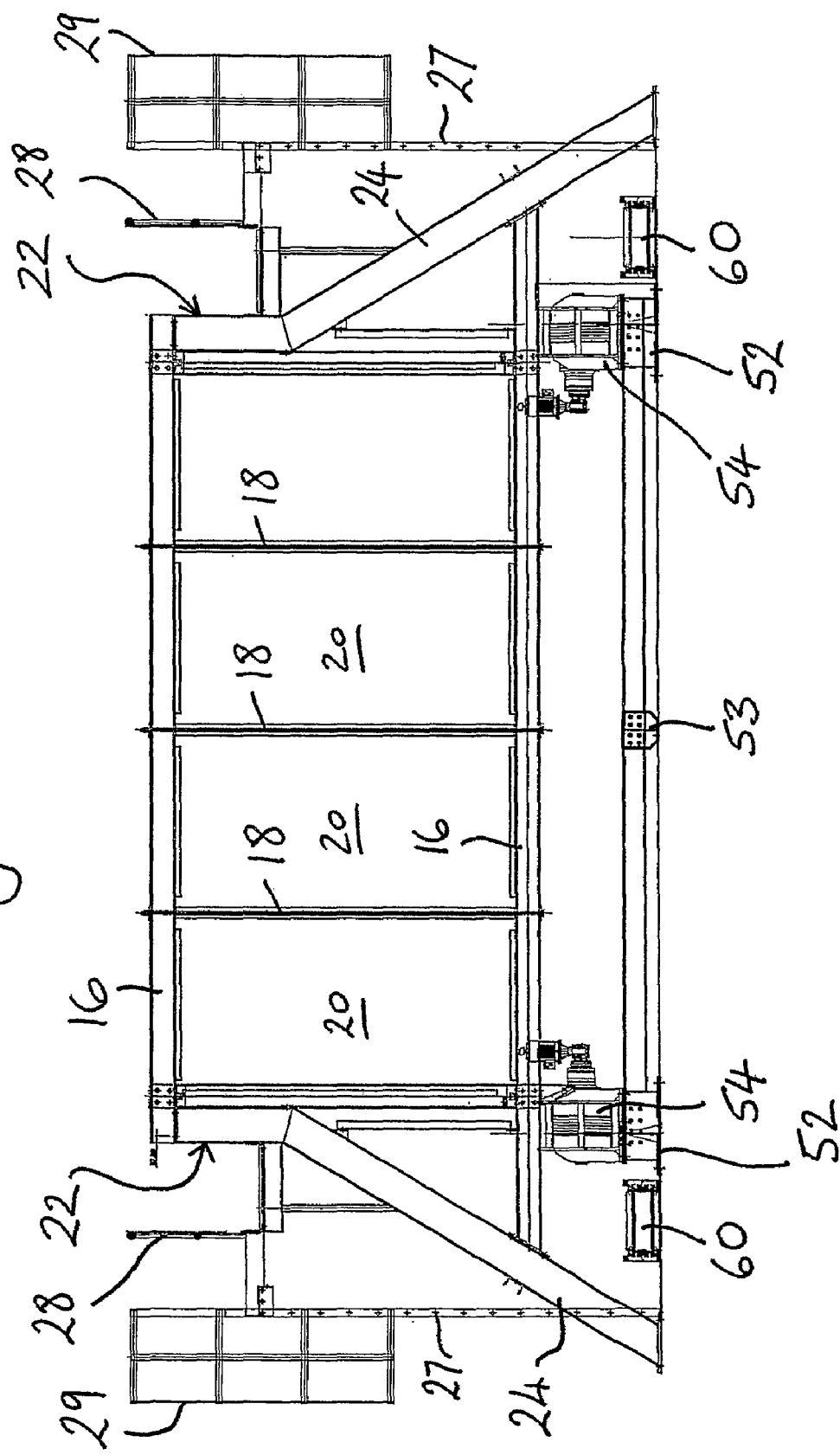
FIG. 3 is a front elevation, to an enlarged scale, of the composting cage shown in FIGS. 1 and 2 omitting the cutter for clarity.
Figure 4:
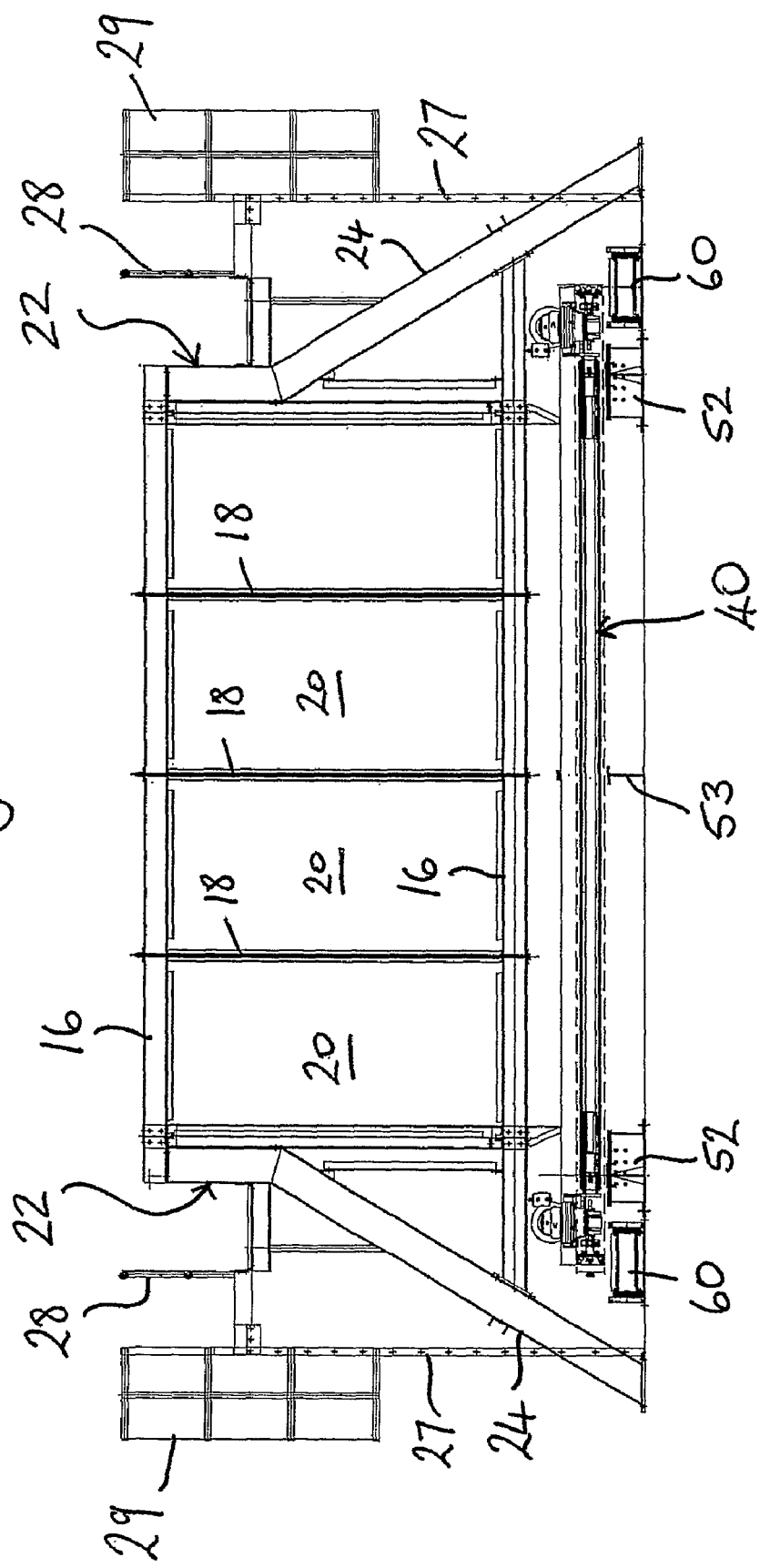
FIG. 4 is also a front elevation of the composting cage shown in FIGS. 1 and 2, but this time omitting the winch assemblies for clarity.

As shown in FIGS. 3 and 4, each cross wall 12, including that at the front and the rear of the enclosure 10, comprises upper and lower box section steel beams 16 which are held together by substantially vertical tie rods 18 and between which four side-by-side panels 20 are mounted. These panels 20 are preferably of glass fibre reinforced plastics material and serve an insulating as well as a structural function. The sides of each cross wall 12 are mounted to respective legs 22, which are also formed or steel beams and include respective oblique sections 24, as clearly shown in FIGS. 3 and 4.

As shown in FIG. 1, the side walls 14 of the enclosure 10 are formed by respective upper and lower steel elements 15, 17 which are mounted between adjacent cross walls 12 and between which respective individual side wall panels 20, conveniently of the same material and dimensions as the panels of the cross walls 12, are mounted. Additional oblique cross braces 19 may be provided between adjacent cross walls 12 wherever these are considered to be needed to strengthen the overall structure.

The entire enclosure 10 is held at a spacing above the ground by means of the oblique sections 24 of the legs 22. At each side of the enclosure 10 a respective elevated walkway 28 may be provided, as shown in FIGS. 3 and 4, along with access ladders 27 and respective safety frames 29 for these.

Figure 5:
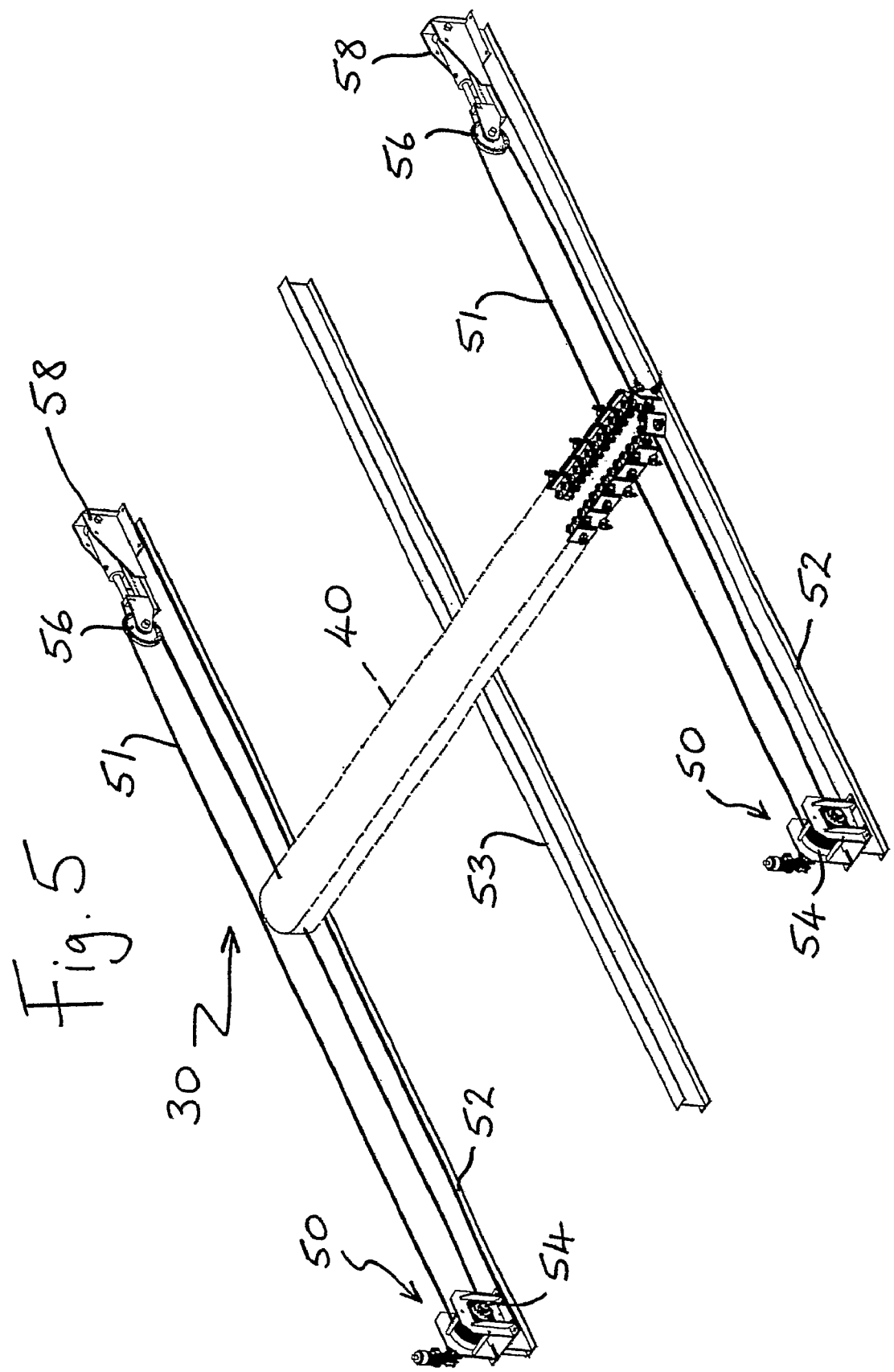
FIG. 5 is a schematic perspective view of the offloading arrangement of the composting cage shown in FIGS. 1 to 4, namely the winch assemblies and cutter.

The offloading apparatus 30, as best shown in FIG. 5, comprises an elongate cutter device 40, respective winch assemblies 50 and also respective conveyors 60.

The conveyors 60 are typically endless slatted chain conveyors of known type. These extend along adjacent each side of the enclosure 10, as indicated schematically in FIG. 2.

They are arranged outside but closely adjacent the gap below the base of the enclosure 10 and they also extend beyond the front and rear ends of the enclosure 10.

Figure 2:
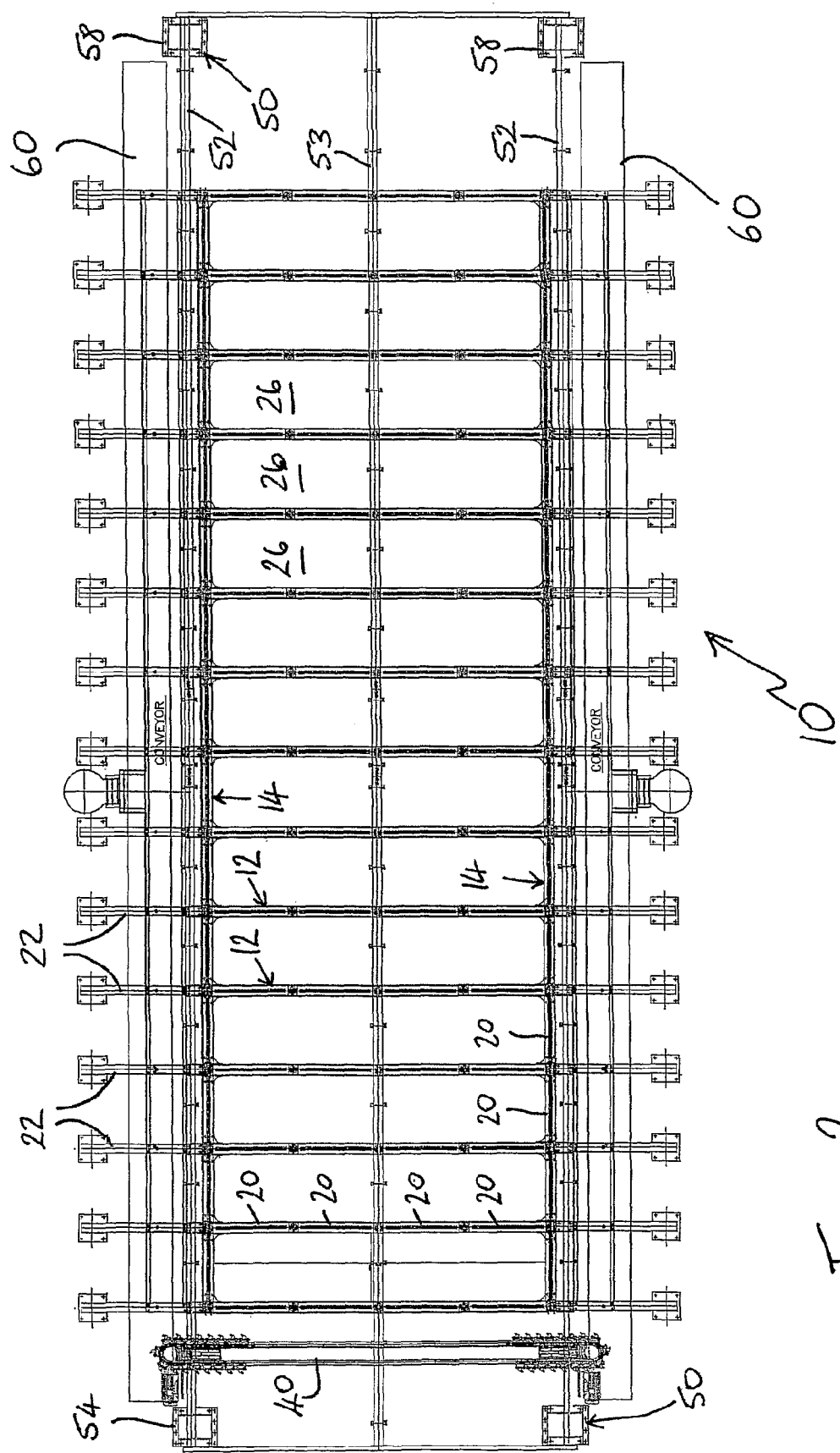
FIG. 2 is a plan view of the composting cage shown in FIG. 1.

The winch assemblies 50 are also arranged to extend along adjacent each side of the enclosure 10 and beyond the front and rear ends of the enclosure 10. As best shown in FIG. 5, each assembly comprises an elongate guide rail 52, which is supported directly upon the ground or floor, a motor driven winch 54 mounted at one end of the rail 52 and a pulley 56 mounted by means of an adjustable tensioning/ bracket assembly 58 at the other end of the rail 52, with a winch cable 51 extending from the winch 54, around the pulley 56 and back again to the winch 54. As shown in FIG. 2, these winch assemblies 50 extend at each side just outside the base of the enclosure 10, between the enclosure 10 and the respective conveyor 60.

The elongate cutter device 40 is shown in greatest detail in FIGS. 6 to 8. It is in the form of an endless chain, guided around spindles 48 and driven by motors 46, with cutting teeth 42 mounted on each link 44 of the chain. The cutter device 40 is mounted transversely of the enclosure 10, that is to say parallel with the respective cross walls 12 of the enclosure 10, at a level below the base of the enclosure 10, as best shown in FIG. 7. The spindles 48 are disposed vertically so that the chain mounting the teeth 42 extends to the front and the rear. The cutter 40 is mounted between the respective winch assemblies 50 as shown diagrammatically in FIG. 5. Adjacent each of its ends the cutter 40 is supported in a slidable manner upon the respective guide rail 52. A central support beam 53 is provided midway between and substantially parallel to the guide rails 52, below the enclosure 10. The cutter 40 is additionally slidably supported in its central region across this beam 53.

The cutter device 40 is mounted to the lower bight of each winch cable 51 by a respective carriage 57 which is inserted between ends of the cable 51 and is slidably seated on the respective guide rail 52, as indicated in FIG. 1.

Power supply to the motors 46 of the cutter device 40 is independent of power supply to the winches 54.

In use the purpose of the offloading apparatus is to remove composted material from the bases of the compartments 26 of the composting enclosure 10.

In use, with the cutter device 40 switched on, the winches 54 are operated in unison to move the cutter device 40 below the enclosure 10 from one end to the other, that is from the winch drive end 54 at the front of the enclosure 10 to the tensioning end 58 at the rear of the enclosure 10, or vice versa. As the cutter device 40 is advanced in this way, as it approaches the far end, a limit switch (not shown) is triggered, for example by one of the carriages 58, which causes the winch drive to stop, and may also switch off the cutter motors 46. The winches 54 can then be operated in reverse to pull the cutter 40 back to the first end of the enclosure 10.

The speed of operation of the winches 54 can be controlled in conventional manner. Typically, a relatively slow speed of movement of the cutter 40 by the winches 54 is required. For example, the time taken for the cutter 42 to move below each compartment 26 may typically be required to be a minimum of five minutes.

As it moves, the cutter 42 removes a section of composted material at the base of the successive compartments 26 of the enclosure 10. The teeth 42 of the cutter move across the front (in the direction of advance) of the cutter 40 and accordingly they operate in one transverse direction only to remove the compost to one side or the other of the enclosure 10. In this way, the compost is deposited on one of the conveyors 60 as the cutter 40 is pulled from the front to the rear of the enclosure 10 and on the other of the conveyors 60 when the cutter is pulled along in the opposite direction from the rear to the front of the enclosure 10.

The foregoing is illustrative and not limitative of the scope of the invention and many variations in detail are possible in other embodiments as will be readily apparent to those skilled in the art.

The invention claimed is:

1. A composting cage comprising an enclosure for receipt of material to be composted and offloading apparatus mounted below the enclosure in order to extract compost from the base of the enclosure, the offloading apparatus comprising an elongate cutter in the form of a motor driven endless chain on which cutting teeth are mounted, which cutter is capable of travelling below the enclosure, wherein the offloading apparatus further comprises respective winch assemblies mounted adjacent each side of the enclosure, each winch assembly comprising a motor driven winch, a pulley mounted to an adjustable tensioning assembly at a spacing from the winch, and a winch cable extending from the winch, around the pulley and back again to the winch, said cutter extending below the enclosure, between the respective winch assemblies in such a manner as to be movable by said winch assemblies in a direction substantially perpendicular to its elongate axis.

2. A composting cage according to claim 1 wherein the cutter is slidably supported across plural guide rails.

3. A composting cage according to claim 1 wherein the offloading apparatus comprising the cutter and the winch assemblies, is mounted separately from the enclosure.

4. A composting cage according to claim 2 wherein the offloading apparatus comprising the cutter and the winch assemblies, is mounted separately from the enclosure.

\* \* \* \* \*